United States Patent Office 3,567,265
Patented Mar. 2, 1971

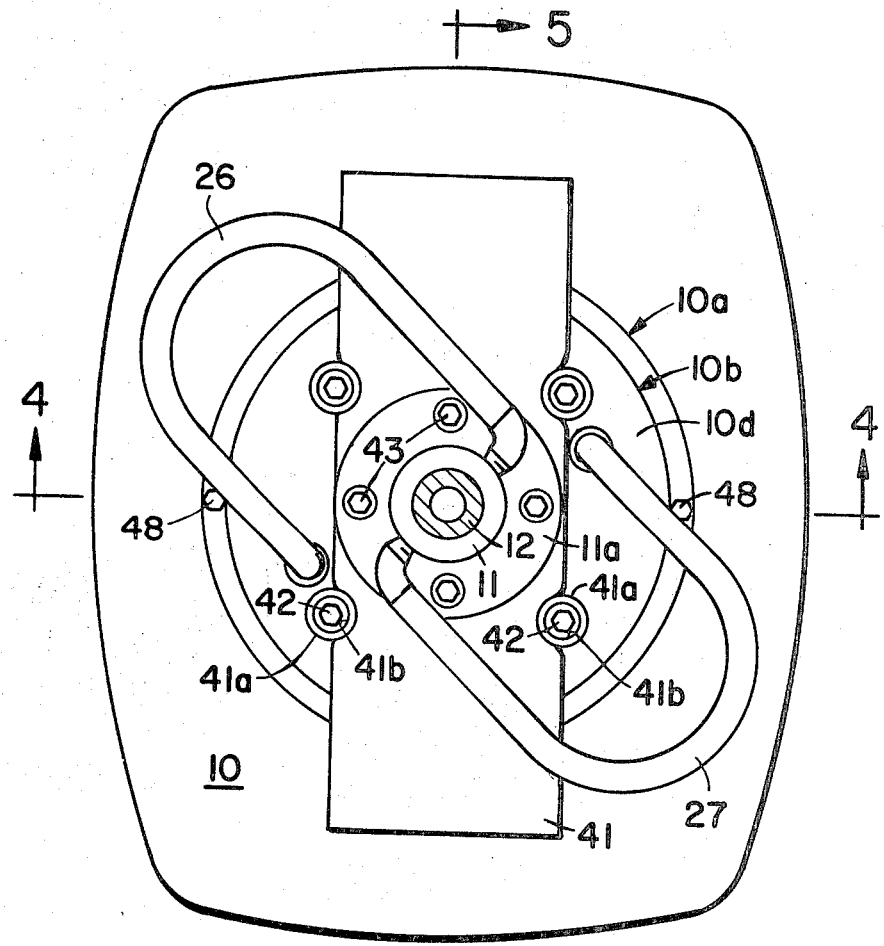
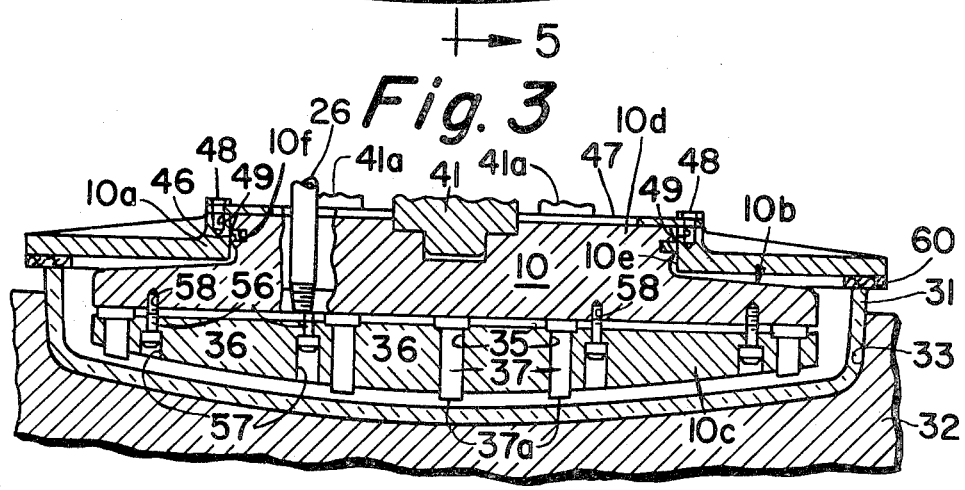
Fig. 3
Fig. 5
INVENTORS.
Wendell S. Blanding
Richard F. Kruger
BY Charles W. Gregg
AGENT

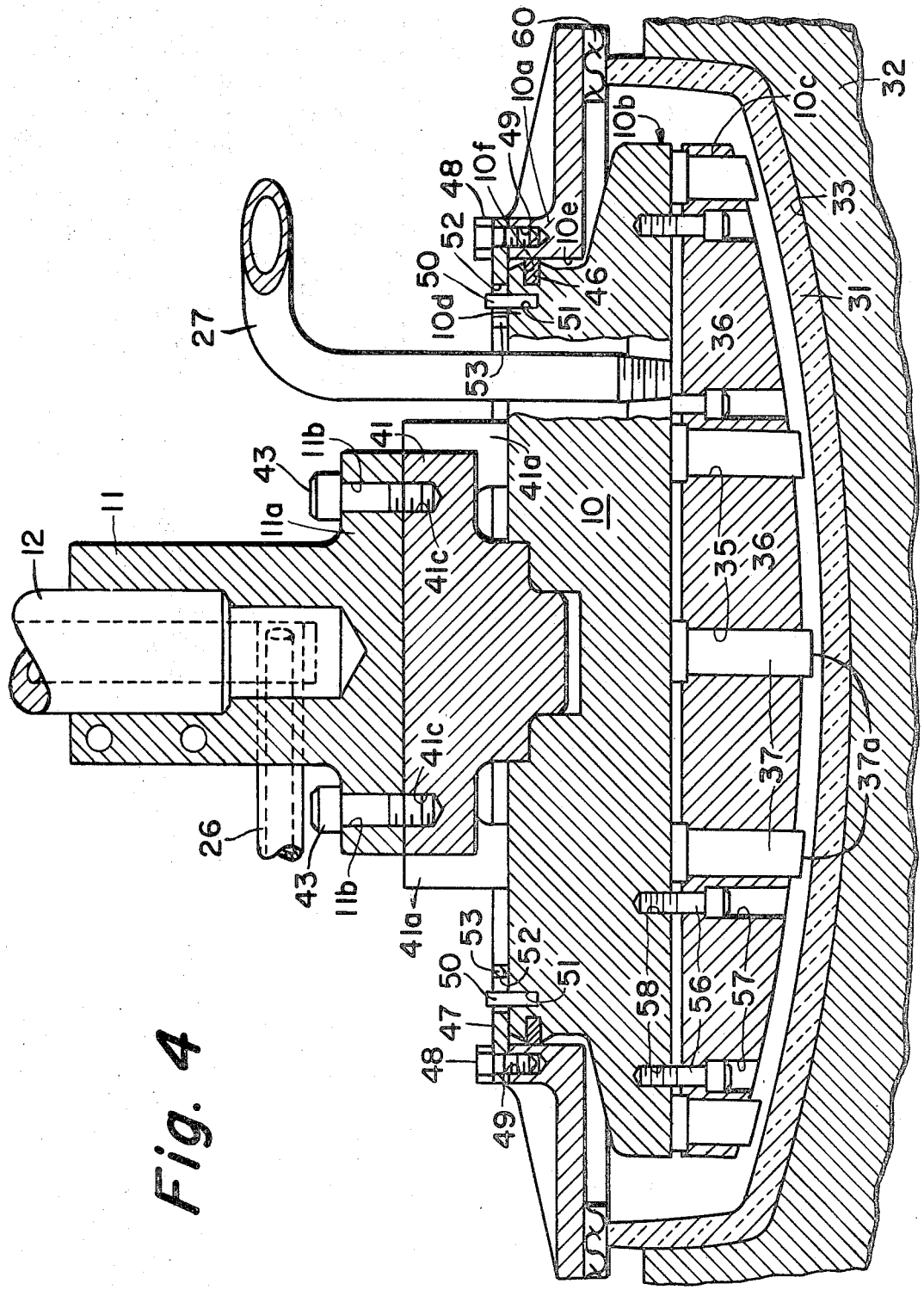

3,567,265
APPARATUS FOR REMOVING GLASS VIEWING
PANELS FROM A MOLD
Wendell S. Blanding, Painted Post, N.Y., and Richard F.
Kruger, Saratoga, Calif., assignors to Corning Glass
Works, Corning, N.Y.
Filed Apr. 29, 1968, Ser. No. 724,866
Int. Cl. B66c 1/02; C03b 11/00
U.S. Cl. 294—65                                    6 Claims

ABSTRACT OF THE DISCLOSURE

Takeout apparatus for removing articles such as viewing panels for television picture tubes from their forming molds by the use of negative pressure or vacuum and without distortion of such articles. The apparatus comprises a vacuum head having an annular outer member whose bottom surface contacts the sealing edge of each formed panel, and an inner member supporting a plurality of downwardly extending spaced-apart posts or pedestals of varying lengths on the bottom of such inner member, the free ends of such posts being shaped to correspond to selected areas on the inner surface of the face plate portion of each of said panels, said areas being drawn into contact with said ends of said posts when said inner member moves into the interior of each respective panel until said bottom surface of said outer member contacts the sealing edge of the respective panel and vacuum or negative pressure is supplied through the inner member to the interior of such panel. The outer member closely encompasses the outer periphery of said inner member in a snug but slidable relationship therewith and with a substantially airtight seal therebetween. The posts on the bottom of said inner member prevent distortion of the panels when said vacuum is supplied to the interior thereof.

BACKGROUND OF THE INVENTION

The present invention relates to apparatus for removing articles, molded from a thermoplastic material, from their forming molds. The apparatus is especially useful in removing articles, such as viewing panels for television picture tubes, from their forming molds, such articles having relatively large surface areas in proportion to the thickness of the walls of such articles and, therefore, being subject to distortion during or immediately following their removal from said molds when still at a relatively high temperature following the forming thereof.

SUMMARY OF THE INVENTION

In practicing the invention there is provided a vacuum head which is moved into position over an article, such as a viewing panel for a television picture tube, immediately following the forming thereof in a mold and which is lowered into the interior of the formed panel until an outer annular member of such vacuum head, surrounding an inner member of such head in an airtight relationship therewith, contacts the sealing edge of the formed panel. The bottom of said inner member of the vacuum head is provided with a plurality of spaced-apart downwardly extending pedestals or posts which contact selected areas on the inner surface of said panel when vacuum or negative pressure is supplied through the vacuum head to the interior of the panel and the panel is thereby partially drawn upwardly out of the mold. Said posts prevent distortion of the newly formed and still hot panel by said vacuum or negative pressure supplied to the interior of the panel. The panel is thereafter fully removed from the mold by upward actuation of said vacuum head and its associated apparatus.

BRIEF DESCRIPTION OF THE DRAWINGS

In the drawings:
FIG. 3 is a top view of the apparatus of FIG. 1 taken generally along line 3—3 of such drawing figure;
FIG. 4 is a cross-sectional elevational view of part of the apparatus of FIG. 1 on an enlarged scale and taken generally along line 4—4 of FIG. 3;
and
FIG. 5 is a cross-sectional elevational view similar to FIG. 4 but on a smaller scale and taken generally along line 5—5 of FIG. 3 and illustrating only a lower portion of the apparatus of FIG. 1.

Similar reference characters refer to similar parts in each of the figures of the drawings.

PREFERRED EMBODIMENT OF THE INVENTION

Figure 1:
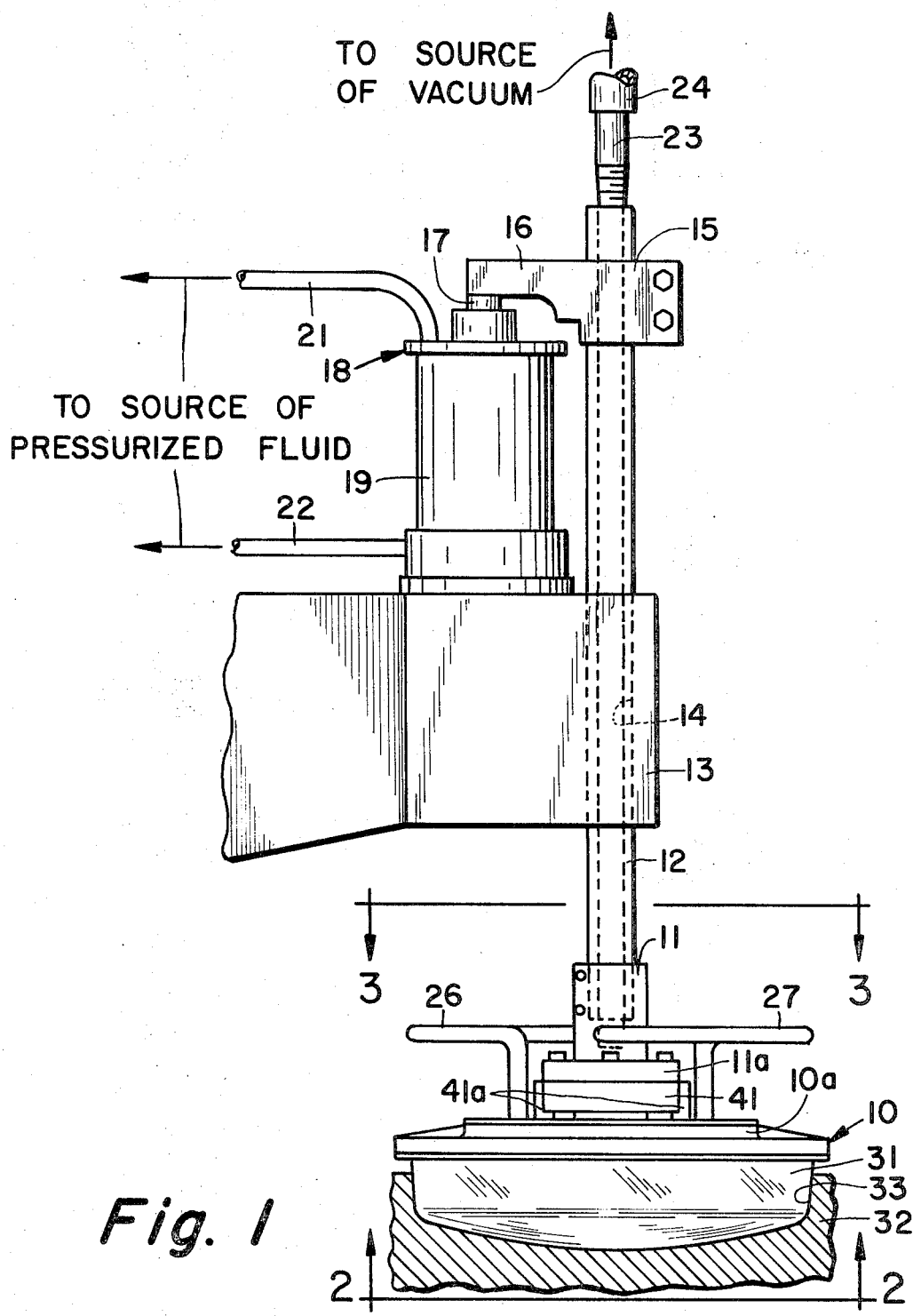
FIG. 1 comprises an elevational view of the apparatus embodying the invention and disposed in a position for removing a television viewing panel from its forming mold.

Referring to the drawings in detail, there is shown in FIG. 1 a vacuum head 10 which is secured, as by a clamp 11 having a bottom flange portion 11a, to the bottom of a hollow shaft or operating rod 12 which extends through a passage 14 in a support arm 13 in a snug but slidable relationship therewith. A clamp 15 is secured to the upper end of operating rod 12 and a laterally extending arm portion 16 of clamp 15 is secured in any convenient manner to the outer end of a piston rod 17 which extends out of the upper end of a pressurized fluid motor 18, including the usual cylinder 19, and which connects within said cylinder with the usual piston (not shown) of the cylinder-piston motor. Motor 18 is secured to the top of support arm 13 in any convenient manner and a pair of flexible conduits 21 and 22 connect through the upper and lower ends, respectively, of cylinder 19 to the upper and lower ends of the bore of such cylinder. The second ends of such conduits are connected through suitable control valves to a source of pressurized fluid for selective actuation of the piston of motor 18 in the manner well known in the art. For purpose of simplification of the drawings said control valves and said fluid source are not shown therein.

The upper end of shaft or operating rod 12 is provided with a nipple or short length of conduit 23 having a threaded first end which is screwed into cooperative threads provided in the upper end of the hollow extending through shaft 12. One end of a flexible length of conduit 24 is connected in any convenient manner to the second end of nipple or conduit 23 and the other end of such flexible conduit is connected through a suitable valve or valves to a source of negative pressure or vacuum in a manner well known in the art. Said valve or valves and said vacuum source are also not shown in the drawings for purpose of simplification thereof. However, as mentioned above and as hereinafter further discussed, the arrangement of said valve or valves for selectively supplying vacuum or negative pressure to the hollow extending through shaft or operating rod 12 will be readily apparent to those skilled in the art.

The hollow in shaft or operating rod 12 is connected at the lower end thereof with first ends of a pair of conduits 26 and 27 whose second ends connect with vacuum head 10 to apply said negative pressure or vacuum to the interior of vacuum head 10 as hereinafter further discussed. Vacuum head 10 includes a flanged outer annular member 10a (FIGS. 1 through 5), inner member 10b (FIGS. 2, 3, 4 and 5) including a lower portion 10c (FIGS. 2, 4 and 5) and an upper portion 10d (FIGS.

2, 3, 4 and 5). The lower portion 10c of vacuum head 10 is illustrated in FIGS. 1, 4 and 5 in a position such that such portion of the vacuum head is disposed within the hollow or cavity of a television viewing panel 31 which is still in the forming cavity 33 of a mold 32 which is employed in the forming of such panel. Only a portion of a cross-section of mold 32 is illustrated in said figures of the drawings which will be hereinafter discussed in detail.

Figure 2:
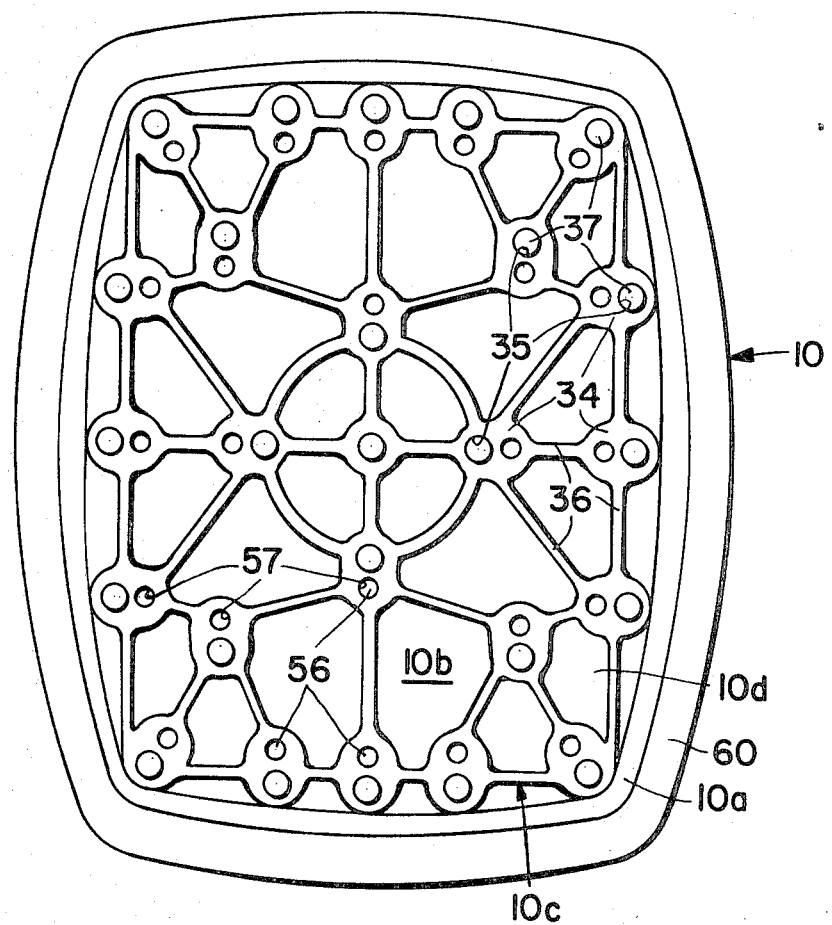
FIG. 2 is a bottom view of the apparatus of FIG. 1 taken generally along line 2—2 of such drawing figure but without showing said viewing panel and its forming mold.

Referring now to FIG. 2 of the drawings, bottom portion 10c of inner member 10b of vacuum head 10 is illustrated as comprising a plurality of symmetrically and selectively spaced-apart members such as 34 which are connected with each other in a web-like array by ribs such as 36. Each such member 34 includes a passage such as 35 (FIGS. 2, 4 and 5) extending vertically through the respective member and in each of which is secured, as hereinafter further discussed, a pendant pedestal or post such as 37 having a length somewhat greater than the respective passage 35 in which each respective post 37 is secured.

Referring now to FIGS. 3 and 4 of the drawings taken in conjunction with FIG. 1, a support plate 41 is secured to upper portion 10d of inner member 10b of vacuum head 10 by socket-headed bolts such as 42 (FIG. 3) whose heads are disposed in recesses such as 41b in bosses such as 41a (FIGS. 3, 4 and 5) provided on and extending outwardly from plate 41. Screws 42 extend through said bosses and are screwed into cooperatively threaded holes (not shown) provided in said portion 10d. Support plate 41 is, in turn, secured to the flange portion 11a of clamp 11 by bolts such as 43 (FIGS. 3 and 4) extending through holes such as 11b provided in said flange portion and screwed into cooperatively threaded holes 41c provided in the top surface of support plate 41.

Outer annular member 10a of vacuum head 10 embodies a circular orifice 10e which closely surrounds upper portion 10d of inner member 10b of vacuum head 10 in a relatively snug but slidable relationship therewith, such portion 10d having a circular outer periphery substantially conforming to said orifice 10e in said annular member 10a. A piston ring 46 (FIGS. 4 and 5) is provided in an annular channel 10f extending about the outer peripheral surface of said upper portion 10d of member 10b, and the outer peripheral surface of piston ring 46 contacts the inner surface 10e of annular member 10a in a snug but slidable relationship therewith and in the usual manner of a piston ring. It will thus be apparent that said outer annular member 10a, in effect, comprises a cylinder having a bore 10e, and upper portion 10d of inner member 10b, in effect, comprises a piston, including a piston ring 46, which is disposed in the bore of said cylinder. This arrangement will be further discussed hereinafter.

A generally circular annular plate 47 is secured to the top surface of the top annular rim of member 10a by bolts such as 48 extending through suitable holes provided in plate 47 and screwed into cooperatively threaded holes such as 49 provided in said annular rim of member 10a. One end of each of a pair of dowel pins such as 50 (FIG. 3) are driven into cooperative and tightly fitting holes such as 51 provided in said portion 10d of inner member 10b of vacuum head 10. The second or upper ends of the dowel pins such as 50 extend through longitudinal slots 52 provided in inwardly extending ear portions 53 of said annular ring 47. Such slots are of a length such as to permit movement of dowel pins 50 in a radial direction in such slots but are of a sufficiently narrow width so as to prevent any appreciable movement of said dowel pins in any other direction. Thus, annular plate 47 normally supports annular member 10a of vacuum head 10 since the lower surface of annular plate 47 normally rests on the outer portion of the top surface of upper portion 10d of inner member 10b of such vacuum head. Dowel pins 50 prevent rotational movement of member 10a about said upper portion 10d of inner member 10.

Lower portion 10c of inner member 10b of vacuum head 10 was previously described with reference to FIG. 2 of the drawings. However, referring now to FIGS. 4 and 5 taken in conjunction with FIG. 2, said portion 10c is secured to the bottom surface of upper portion 10d of inner member 10b by a plurality of socket-headed bolts such as 56 whose heads are disposed in recesses such as 57 provided in the bottom of said portion 10c and which extend upwardly through such bottom portion and are screwed into cooperatively threaded holes such as 58 provided in the bottom of said upper portion 10d. The upper ends of the previously mentioned posts such as 37, which are disposed in the passages such as 35 in the spaced-apart members such as 34 as previously discussed, are flanged and are immovably clamped between the upper surface of lower portion 10c of inner member 10b of vacuum head 10 and the lower surface of upper portion 10d of inner member 10b. The lower ends 37a of the posts such as 37 extend somewhat out of or below the lower ends of their respective passages 35 and, when necessary, are beveled or otherwise shaped so that they may make areal contact with the selected areas of the inner surface of the face plate of a panel such as 31 with which they are intended to come into contact.

As shown in FIGS. 2, 4 and 5, an annular pad 60 of a resilient, thermal resistant and substantially hermetic material, such as an asbestos fibre material for example, is secured in any convenient manner to the bottom of the flange portion of annular member 10a of vacuum head 10, the bottom surface of such annular pad thereby forming the lowermost surface of said annular member. The annular shape of annular pad 60 is such that such pad will contact the upper surface of the annular sealing edge of a viewing panel such as 31 (FIGS. 4 and 5) at all points therealong when the apparatus is employed in removing such a panel from its forming mold.

BRIEF OPERATIONAL EXAMPLE OF THE INVENTION

In employing the apparatus of the invention for removing a newly formed viewing panel such as 31 from its forming mold, support arm 13 moves the takeout apparatus to a position above and such that the longitudinal axis of operating rod 12 is axially aligned perpendicular to the center of the plane of the face plate of the viewing panel when such panel is located at its takeout position. Arm 13 may be actuated either linearly, or arcuately, that is, with a sweeping motion, to position said apparatus as stated. Support arm 13 and its associated actuating apparatus per se form no part of the present invention, and such mechanisms are old and well known to those skilled in the art and, therefore, are not shown in the drawings for purposes of simplification thereof.

As is obvious, at the time of the positioning of the takeout apparatus to the position discussed above, vacuum head 10 must be in its uppermost position so as to clear the sealing edge of panel 31 during the period said apparatus is being so positioned. Therefore, at such time, pressurized fluid is supplied through conduit 22 to cylinder 19 of cylinder-piston motor 18 while conduit 21 is connected to atmosphere or a suitable fluid sink, and operating rod 12 and vacuum head 10 are, therefore, in their uppermost positions at such time.

Following the positioning of the apparatus to its said position above viewing panel 31, the supply of pressurized fluid to conduit 22 is terminated and such conduit is connected to atmosphere. At the same time, conduit 21 is disconnected from atmosphere or said fluid sink and pressurized fluid is supplied to such conduit. As previously mentioned, the valves or valving arrangement for so controlling said connections are also well known to those skilled in the art.

The pressurized fluid supplied to conduit 21 actuates the piston of cylinder-piston motor 18 and, thereby, piston rod 17, operating rod 12 and vacuum head 10 to their lowermost positions. Vacuum head 10, during such actuation, enters the cavity in viewing panel 31 until it reaches the position shown in FIGS. 1, 4 and 5, that is, until the lower surface of pad 60 (FIGS. 4 and 5) comes into relatively firm and substantially hermetic contact with the upper surface of the sealing edge of viewing panel 31. Conduit 24 (FIG. 1) is then connected to the previously-mentioned source of negative pressure or vacuum.

The vacuum supplied to conduit 24 and thence to the hollow extending longitudinally through shaft or operating rod 12 is, in turn, supplied through conduits 26 and 27, and thence about and between the ribs such as 36 of bottom or lower portion 10c of inner member 10b of vacuum head 10, to the interior or cavity of panel 31. Such vacuum draws panel 31 upwardly out of the cavity 33 in forming mold 32 until the lower ends 37a of the pedestals or posts such as 37 come into contact with the previously-mentioned selected areas of the inner surface of the face plate of panel 31. Since the material of which panel 31 is formed is still in a semiplastic condition at such time, the pedestals or posts such as 37 are provided so as to support the face plate of panel 31 at selected locations thereon and in such a manner that the vacuum supplied to the interior or cavity of such panel will not warp or otherwise distort the shape supplied to said face plate by the bottom surface of cavity 33 of forming mold 32 during the forming of panel 31 in such cavity of the forming mold.

During the drawing of panel 31 upwardly out of its forming mold as mentioned above, the top surface of the sealing edge of such panel presses upwardly against the lower surface of pad 60 which, as previously mentioned, is considered the lowermost surface of the flanged portion of outer annular member 10a of vacuum head 10. At such time, said sealing edge presses upwardly against and actuates said outer annular member in an upward direction a distance corresponding to that existing between the ends of posts 37 and the inner surface of the face plate of panel 31, as is readily apparent. During the actuation of said annular member 10a in its upward direction, the inner surface of such annular member which defines the outer limits of circular orifice or cylinder bore 10e embodied in the annular member slides upwardly on the outer surface of piston ring 46. It is thus apparent that inner member 10b and outer member 10a of vacuum head 10, as previously mentioned, have a piston-cylinder relationship in which the cylinder member (annular member 10a) is the member which is normally movable in relationship to the piston member (upper portion 10d of inner member 10b).

Following the initial upward movement of panel 31 out of its forming mold 32 as discussed above and occurring as a result of the vacuum applied to the interior or cavity of panel 31, operating rod 12 is actuated in its upward direction to complete the removal of panel 31 from its forming mold. For such upward actuation of operating rod 12, conduit 21 (FIG. 1) is disconnected from said source of pressurized fluid and again connected to atmosphere or the previously-mentioned fluid sink while conduit 22 is disconnected from atmosphere or such fluid sink and connected to said pressurized fluid source. Support arm 13 is then actuated, in the direction opposite to that previously mentioned in connection therewith, to move panel 31 from above its forming mold and above a suitable table or similar platform means upon which such panel can be placed. Conduit 24 is then disconnected from the previously-mentioned source of vacuum and is connected to atmosphere. This, of course, terminates the application of vacuum to the cavity or interior of panel 31 and such panel is released from vacuum head 10 and is deposited on said table or platform means. The apparatus is then ready to be again actuated, in the manner just described, to remove another panel from its forming mold.

Although there is herein shown and described a single embodiment of the invention, it will be understood that such is not to be considered limiting in any way but that the scope of the protection sought for the invention disclosed is intended to be limited only by the spirit and purview of the appended claims.

We claim:

1. Apparatus for removing from its forming mold and without distortion thereof an article formed from a thermoplastic material and including an upwardly extending annular rim, such apparatus comprising, in combination, (A) a vacuum head comprising;

(a) an annular outer member having a circular inner surface of a diameter smaller than the smallest diametric dimension of the planar space bounded by the inner surface of said annular rim of said article and a configuration corresponding, to such rim such that the lowermost surface of such member can contact the top surface of said rim at all points thereon; and (b) an inner member having a top portion with a circular outer peripheral surface disposed within said inner surface of said annular member and embodying in a groove extending about such outer peripheral surface a piston ring whose outer peripheral surface firmly contacts the inner surface of the annular member, such member also having a bottom portion including an outer peripheral surface slightly smaller than and corresponding in configuration to the outer limits of said planar space bounded by said inner surface of said annular rim of said article, and a plurality of pendant spaced apart posts supported on and extending downwardly from such bottom portion, such posts having lengths so selected and free ends so shaped that the entire areas of such ends will simultaneously contact selected areas on the inner surface of the bottom of said article when said bottom portion of said inner member is disposed in the cavity of said article bounded by said inner surfaces thereof with at least one of said ends of said posts contacting the inner surface of the bottom of the article;

(B) means attached to said top portion of said inner member of said vacuum head for vertical reciprocative actuation of the vacuum head, the bottom portion of the inner member of the vacuum head, during downward actuation thereof, being moved into said cavity of said article until said lowermost surface of said annular outer member contacts said top surface of said annular rim; and (C) conduit means for applying vacuum through said vacuum head and between said posts to the inner surfaces of said cavity of said article to draw such article upwardly and partially out of its mold when said lowermost surface of said annular outer member contacts said top surface of said annular rim and to thereby actuate said annular member upwardly on said piston ring until said free ends of said posts contact said selected areas on said inner surface of the bottom of said article, whereby said vacuum head actuating means can then be actuated upwardly to complete removal of said article from its forming mold without distortion of such article by said vacuum applied to said inner surfaces of the cavity in the article.

2. Apparatus as set forth in claim 1 and in which said lowermost surface of said annular member comprises an annular pad of heat-resistant and substantially hermetic material.

3. Apparatus in accordance with claim 1 and in which said article is a viewing panel for a cathode-ray tube envelope.

4. Apparatus in accordance with claim 2 and in which said article is a viewing panel for a cathode-ray tube envelope.

5. Glass mold takeout apparatus for removing a television viewing panel or the like from its forming mold without distortion thereof, such apparatus comprising, in combination, (A) an aeriform fluid cylinder and association piston, such cylinder comprising, an annular member having,
  (a) a circular inner surface of a diameter smaller than the smallest diametric dimension of the planar space bounded by the inner surface of the annular rim of said panel, and
  (b) a configuration corresponding to said rim and such that the lowermost surface of such member can contact the top surface of said annular rim at all points thereon;
and said piston comprising a vacuum member having,
  (c) a top portion with a circular peripheral surface disposed within said inner surface of said cylinder in a snug but slidable piston-cylinder relationship therewith, and
  (d) a bottom portion including,
    (I) a peripheral surface slightly smaller than and corresponding in configuration to said planar space bounded by said inner surface of said annular rim of said panel, and
    (II) a plurality of symmetrically spaced-apart posts affixed to and extending downwardly from such bottom portion, such posts having lengths selected and free ends shaped so that the entire area of each such end will contact a selected area on the inner surface of the face plate of said panel simultaneously with the others of such ends when the vacuum member is disposed in the cavity of said panel with at least one of said ends contacting said inner surface of said face plate;

(B) cylinder-piston actuating means including a hollow rod attached to the top portion of said vacuum member for reciprocative vertical actuation of such member and said cylinder, the vacuum member being actuable downwardly by said means partially into said cavity of said panel and until said lowermost surface of said annular member contacts said top surface of said annular rim of said panel; and (C) conduit means including said hollow rod for supplying negative atmospheric pressure through said vacuum member to the inner surface of said panel to draw such panel upwardly and partially out of its mold when said lowermost surface of said annular member contacts said top surface of said annular rim of said panel and to thereby actuate said cylinder upwardly along said top portion of the vacuum member until said ends of said posts contact said selected areas on said inner surface of said face plate, whereby said cylinder-piston actuating means can then be actuated upwardly to complete removal of said panel from its forming mold without distortion of the panel.

6. Apparatus in accordance with claim 5 and in which said lowermost surface of said annular member comprises the bottom surface of an annular pad of a resilient, thermal-resistant and substantially hermetic material.

References Cited
UNITED STATES PATENTS

| | | | |
|---|---|---|---|
| 3,223,443 | 12/1965 | Misson | 294—65 |
| 3,419,375 | 12/1968 | Meiresonne | 65—260 |
| 3,467,430 | 9/1969 | Lowe | 65—152 |

HOWARD R. CAINE, Primary Examiner

J. B. HARDAWAY, Assistant Examiner

U.S. Cl. X.R.

65—260